US012346210B2

(12) United States Patent
Urs et al.

(10) Patent No.: US 12,346,210 B2
(45) Date of Patent: Jul. 1, 2025

(54) METHOD AND SYSTEM FOR IDEMPOTENT SYNTHETIC FULL BACKUPS IN STORAGE DEVICES

(71) Applicant: EMC IP Holding Company LLC, Hopkinton, MA (US)

(72) Inventors: Deepthi Urs, Bangalore (IN); Shraddha Chunekar, Indore (IN); Adrian Dobrean, Oakville (CA); Navneet Upadhyay, Greater Noida (IN); Sunder Ramesh Andra, Bangalore (IN); Amith Ramachandran, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 64 days.

(21) Appl. No.: 17/524,578

(22) Filed: Nov. 11, 2021

(65) Prior Publication Data
US 2023/0143903 A1    May 11, 2023

(51) Int. Cl.
*G06F 11/14*    (2006.01)
(52) U.S. Cl.
CPC ...... *G06F 11/1451* (2013.01); *G06F 2201/84* (2013.01)
(58) Field of Classification Search
CPC ............. G06F 11/1451; G06F 2201/84
See application file for complete search history.

(56) References Cited

U.S. PATENT DOCUMENTS

| 6,665,815 | B1 | 12/2003 | Goldstein et al. |
| 8,706,833 | B1 | 4/2014 | Bergant et al. |
| 9,020,987 | B1 | 4/2015 | Nanda et al. |
| 9,342,550 | B1 | 5/2016 | Manmohan et al. |
| 9,348,702 | B2 | 5/2016 | Hsu et al. |
| 9,881,014 | B1 | 1/2018 | Bono et al. |
| 10,496,487 | B1 | 12/2019 | Natanzon et al. |
| 2003/0154305 | A1* | 8/2003 | Bethmangalkar ... H04L 67/1034 707/999.01 |
| 2004/0064488 | A1* | 4/2004 | Sinha ............... G06F 11/1451 |
| 2005/0004931 | A1* | 1/2005 | Kihara ............... G06F 11/324 707/999.102 |
| 2010/0274763 | A1 | 10/2010 | Ingen et al. |

(Continued)

OTHER PUBLICATIONS

Preston De Guise, "Data Protection: Ensuring Data Availability", May 2020, CRC Press. 2nd ed. p. 137-156.

*Primary Examiner* — Tony Wu
(74) *Attorney, Agent, or Firm* — Chamberlain, Hrdlicka, White, Williams & Aughtry; Aly Dossa

(57) ABSTRACT

In general, embodiments relate to a method for generating synthetic full backups, the method comprising: performing a verification that a previous backup of source data stored in a data domain is a failed synthetic full backup, obtaining based on the verification a latest snapshot of the source data, obtaining based on the verification a prior snapshot of the source data making a determination, using a copy list that a first portion of the data items in the copy list exists in the previous backup and a second portion of the data items does not exist in the previous backup, and performing based on the determination a copy operation to copy the second portion of the data items to the data domain to obtain a synthetic full backup.

17 Claims, 7 Drawing Sheets

(56) References Cited

U.S. PATENT DOCUMENTS

| | | | |
|---|---|---|---|
| 2014/0244583 A1* | 8/2014 | Wang | G06F 16/2358 |
| | | | 707/625 |
| 2016/0210342 A1 | 7/2016 | Vallabhaneni et al. | |
| 2016/0274975 A1 | 9/2016 | Chen et al. | |
| 2018/0024853 A1* | 1/2018 | Warfield | G06F 9/45558 |
| | | | 718/1 |
| 2019/0278663 A1* | 9/2019 | Mehta | G06F 3/067 |
| 2019/0332488 A1 | 10/2019 | Bono et al. | |
| 2020/0042633 A1 | 2/2020 | Schneider et al. | |
| 2021/0049079 A1 | 2/2021 | Kumar et al. | |
| 2022/0004461 A1 | 1/2022 | Jain et al. | |
| 2022/0318099 A1 | 10/2022 | Kotwal et al. | |
| 2022/0405302 A1 | 12/2022 | Grunwald et al. | |
| 2023/0096910 A1 | 3/2023 | Chunekar et al. | |

* cited by examiner

METHOD AND SYSTEM FOR IDEMPOTENT SYNTHETIC FULL BACKUPS IN STORAGE DEVICES

BACKGROUND

Computing devices often exist in ecosystems that include any number of devices. Devices in such a device ecosystem may perform a variety of workloads. In certain scenarios, data from such devices may be backed up to a target data domain. However, for large data sets (e.g., a Hadoop Distributed File System), full backups of all data may be expensive (e.g., time-consuming, resource intensive, etc.).

BRIEF DESCRIPTION OF DRAWINGS

Certain embodiments discussed herein will be described with reference to the accompanying drawings. However, the accompanying drawings illustrate only certain aspects or implementations of embodiments described herein by way of example and are not meant to limit the scope of the claims.

DETAILED DESCRIPTION

Figure 1:
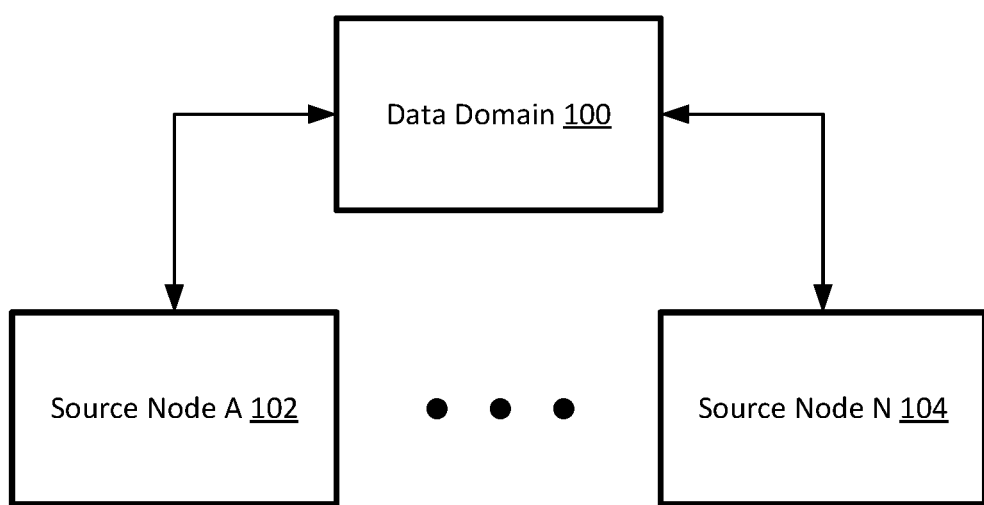
FIG. 1 shows a diagram of a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for generating synthetic full backups of source data in accordance with one or more embodiments described herein. More specifically, embodiments relate to detecting the presence of an error(s) during the backup process (see e.g., FIG. 3A) and then proactively taking steps to repair the error(s) (see e.g., FIGS. 3C-3D). Thus, embodiments provide a more robust backup solution.

FIG. 1 shows a diagram of a system in accordance with one or more embodiments described herein. The system may include a data domain (100) operatively connected to any number of source nodes (e.g., source node A (102), source node N (104)). Each of these components is described below.

In one or more embodiments, the source nodes (102, 104) may be computing devices. In one or more embodiments, as used herein, a source node (102, 104) is any computing device, collection of computing devices, portion of one or more computing devices, or any other logical grouping of computing resources. In one or more embodiments, a source node (102, 104) is part of a device ecosystem, which may include any number of nodes, devices, components, etc. In one or more embodiments, a device ecosystem is a collection of devices, components, etc. arranged and/or operatively connected in any manner, and in which any number of workloads may be executed. One example of a device ecosystem is a Hadoop instance (e.g., a Hadoop cluster), which may include any number of source nodes (102, 104). Other types of device ecosystems may be used without departing from the scope of embodiments described herein.

In one or more embodiments, as discussed above, a source node (102, 104) may be a computing device, a portion of a computing device, a set of computing devices, etc. In one or more embodiments, a computing device is any device, portion of a device, or any set of devices capable of electronically processing instructions and may include, but is not limited to, any of the following: One or more processors (e.g., components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), one or more data processing units (DPUs), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device or source node (102, 104). Other types of computing devices may be used without departing from the scope of embodiments described herein.

In one or more embodiments, the non-volatile storage (not shown) and/or memory (not shown) of a computing device or system of computing devices may be and/or include one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Furthermore, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, source nodes (102, 104) store data, which the source nodes may generate or otherwise obtain. As an example, the source nodes (102, 104) may be configured as a Hadoop cluster. As such, the source nodes may collectively store a HDFS, which may be referred to as source data. Source nodes are discussed further in the description of FIG. 2 below.

In one or more embodiments, the system also includes a data domain (100). In one or more embodiments, the data domain (100) is operatively connected to the source nodes (102, 104). In one or more embodiments, the data domain (100) includes one or more computing devices (described above). In one or more embodiments, a data domain (100) includes any amount of data storage of any type for storing data in any form. In one or more embodiments, the data domain (100) stores any number of backup copies of the source data of the source nodes (102, 104). At least a portion of the backup copies of the source data stored in the data domain are synthetic full backups created, at least in part, using techniques described herein. In one or more embodiments, a data domain (100) to which source data is backed up may be referred to as a target data domain.

In one or more embodiments, the source nodes (102, 104) and the data domain (100) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1 shows a configuration of components, other configurations may be used without departing from the scope of embodiments described herein. Accordingly, embodiments disclosed herein should not be limited to the configuration of components shown in FIG. 1.

Figure 2:
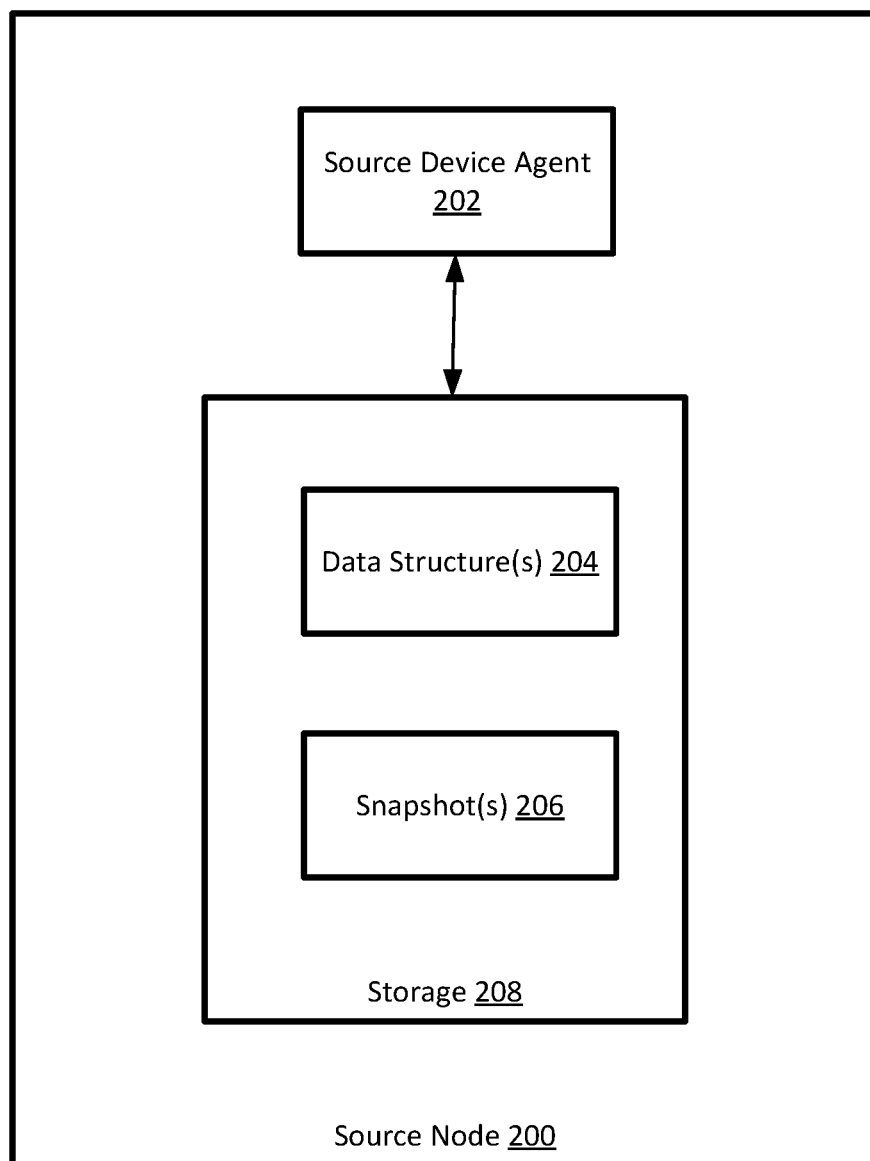
FIG. 2 shows a diagram of a source device in accordance with one or more embodiments described herein.

FIG. 2 shows a diagram of a source node (200) in accordance with one or more embodiments described herein. Source node (200) may include any number of components. As shown in FIG. 2, the source node (200) includes a source device agent (202) and storage (208). In one or more embodiments, the storage (208) includes data structure(s) (204) and snapshot(s) (206). Each of these components is described below.

Source node (200) may be similar, at least in part, to source nodes (102, 104) shown in FIG. 1 and discussed above. However, embodiments of the invention do not require that all source nodes are the same, or that all source nodes perform the same functionality. Instead, in one or more embodiments, certain source nodes (e.g., source node (200)) may be configured to perform additional, less, and/or different functionality and/or components. As an example, a device ecosystem may include any number of virtual machines configured as a Hadoop cluster. Each such virtual machine may be considered a source node, although the virtual machines perform different roles (e.g., master node, worker node, client node, name node, data node, etc.) within the Hadoop cluster, because each such virtual machine may include, contribute to, manage, etc. part of the HDFS (i.e., the source data to be backed up) associated with the Hadoop cluster. Thus, in one or more embodiments, at least one source node in the device ecosystem that includes the source nodes may be as shown in FIG. 2 (i.e., source node (200)) and described herein, but all source nodes need not be. In one or more embodiments, source nodes have in common that they store and/or are associated with data (e.g., a HDFS) that is to be backed up to a data domain (e.g., data domain (100) of FIG. 1) from time to time.

In one or more embodiments, a source node (200) is a computing device, as discussed above in the description of FIG. 1.

In one or more embodiments, the source node (200) includes a source device agent (202). In one or more embodiments, a source device agent (202) is any hardware (e.g., circuitry), software, firmware, or any combination thereof that includes functionality to generate snapshots of source data, to produce difference reports using two such snapshots, and to perform operations on a copy of a previous backup stored in a data domain based on a snapshot difference report. The source device agent (202) may perform any other functionality (e.g., implementing protocols, services, features, etc. for a source node) without departing from the scope of embodiments described herein. One of ordinary skill in the art, having the benefit of this Detailed Description, will appreciate that a source device agent (202) may be computing device hardware (e.g., processor(s) memory, storage, etc.) on which computer readable program code executes to perform operations as described herein. One of ordinary skill in the art will further appreciate that a source device agent cannot exist solely as computer readable program code, as it is the combination of such program code with relevant hardware of the underlying computing device (e.g., source node 200) to create a special purpose computing device that allows for the program code, when executed using said hardware, to perform functionality as described herein. Such program code may be stored, for example, in any tangible, non-transitory computer readable medium of the source node (200) to be accessed and executed to implement the source device agent (202). Certain aspects of functionality of the source device agent (202) is discussed further in the description of FIGS. 3A-3D below.

In one or more embodiments, the source device agent (202) is operatively connected to storage (208) of the source node (200). In one or more embodiments, the storage (208) is a data repository. In one or more embodiments, a data repository is any type of storage unit and/or device (e.g., a file system, database, collection of tables, RAM, and/or any other storage mechanism or medium) for storing data. Furthermore, the data repository may include multiple different storage units and/or devices. The multiple different storage units and/or devices may or may not be of the same type or located at the same physical location.

In one or more embodiments, the storage (208) of source node (200) includes any number of data structures (204). In one or more embodiments, a data structure (204) is any format or organization of data, such as, for example, all or any portion of a file system (e.g., a HDFS). In one or more embodiments, the data structure (204) stores at least a portion of the source data to be backed up to a data domain.

In one or more embodiments, the storage (208) also includes snapshot(s) (206). In one or more embodiments, a snapshot is a point-in-time copy of a file system (e.g., a HDFS). Snapshot(s) (206) may include any number of snapshots, each corresponding to a point in time. In one or more embodiments, a snapshot of the current state of a file system may be referred to as a current snapshot. In one or more embodiments, a snapshot of a file system at a prior point in time may be referred to as a previous snapshot. One or more snapshots of the snapshot(s) (206) may correspond to a backup copy of the file system stored in a data domain. As an example, a snapshot may be generated by a source device agent (202) and used to perform an initial full backup of the file system to which the snapshot corresponds. As another example, a snapshot may be generated by a source device agent (202) sometime after an initial full backup has been performed using a previous snapshot that represents the current state of the file system, and such a snapshot may be used in generating a synthetic full backup using techniques described herein.

While FIG. 2 shows a configuration of components, other configurations may be used without departing from the scope of embodiments described herein. For example, although FIG. 2 shows all components as part of the same device, any of the components may be grouped in sets of one or more components which may exist and execute as part of any number of separate and operatively connected devices. As another example, a single component may be configured to perform all or any portion of the functionality performed by the components shown in FIG. 2. Accordingly, embodiments disclosed herein should not be limited to the configuration of components shown in FIG. 2.

FIGS. 3A-3D show flowcharts describing a method for generating synthetic full backups of source data in accordance with one or more embodiments disclosed herein.

While the various steps in the flowchart shown in FIGS. 3A-3D are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIGS. 3A-3D.

Figure 3A:
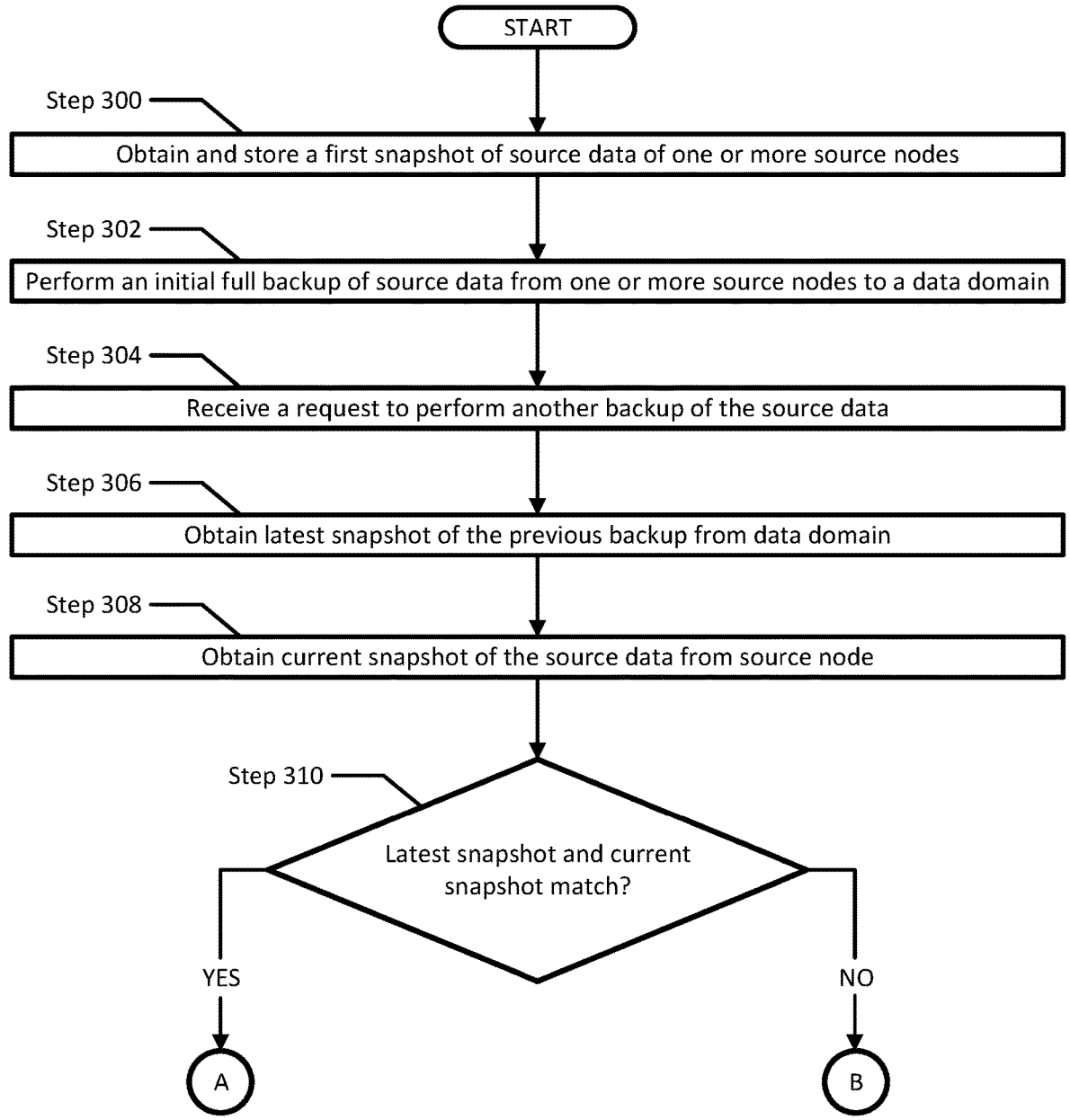
FIGS. 3A-3D show flowcharts of a method for generating synthetic full backups in accordance with one or more embodiments described herein.

Turning to FIG. 3A, in Step 300, a first snapshot of source data is obtained and stored in storage of a source device. In one or more embodiments, a snapshot is a point-in-time copy of a file system. In one or more embodiments, a snapshot includes metadata associated with the source data. As an example, a snapshot may be a HDFS snapshot of a HDFS of a Hadoop cluster. In one or more embodiments, a snapshot is obtained by a source device agent executing on a source node generating the snapshot based on the source data. Source data may be all or any portion of data stored in any number of source devices. As such, a snapshot of source data may be a snapshot of all or any portion of such data. As an example, a HDFS snapshot may be a snapshot of all or any portion of a HDFS.

In Step 302, an initial full backup of the source data to a data domain is performed. In one or more embodiments, the initial full backup is a backup of all of the source data to any number of target data domain devices of a data domain. The initial full backup may be performed by creating a copy of the source data (e.g., a HDFS) stored in a data domain. In one or more embodiments, the initial full backup includes any amount of metadata (e.g., permissions, attributes, etc.) associated with the files and/or folders of the source data. In one or more embodiments, the initial full backup is performed using the snapshot generated in Step 300.

Figure 3B:
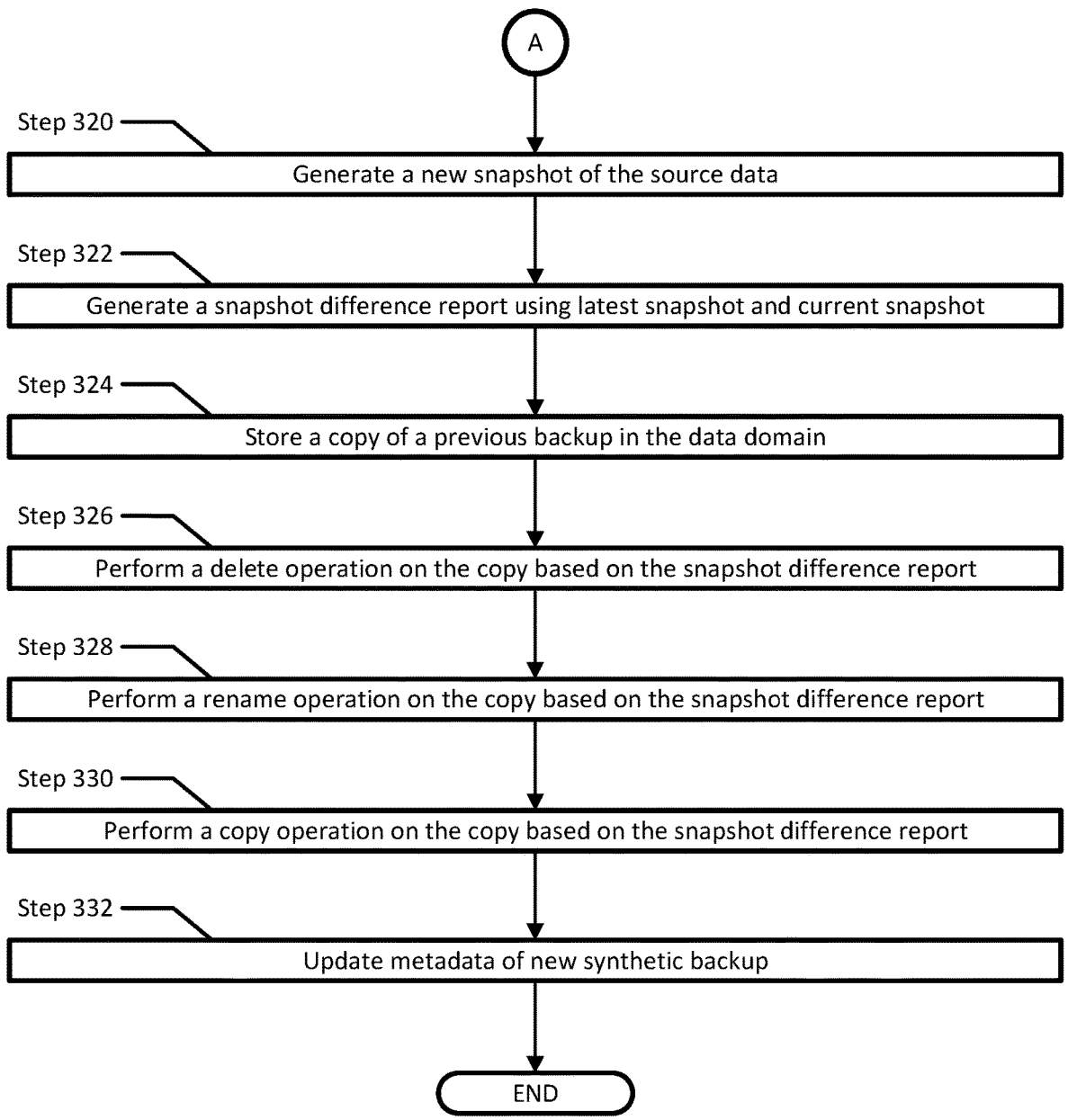

Between Steps 302 and 304, the source device agent may perform the steps in FIG. 3B, which ultimately results in the generation and storage of one or more synthetic full backups on the data domain. Further, as part of performing these steps, one or more snapshots may be stored on the source node.

At some later point in time, in Step 304, a request is received to perform another backup of the source data to the data domain. In one or more embodiments, the request is received by the source device agent of the source node. The request may be initiated, for example, by a user of the source nodes. As another example, the request may be initiated automatically pursuant to a configured backup schedule associated with the source data.

In Step 306, the latest snapshot of the previous backup is obtained from the data domain. In one or more embodiments, the latest snapshot of the previous backup is obtained by the source device agent of the source node. In one or more embodiments, the latest snapshot of the previous backup is the most recently taken point-in-time copy of the file system of the source data in the data domain.

In Step 308, the current snapshot of the source data is obtained from the source node. In one or more embodiments, the current snapshot of the source data is obtained by the source device agent of the source node. In one or more embodiments, the current snapshot of the source data is most recent snapshot of the file system that is present on the source node.

In Step 310, if the result of the determination is YES, which indicates the latest snapshot of the previous backup matches the current snapshot of the source data (i.e., previous backup was successful), the method proceeds to Step 320 in FIG. 3B to perform a synthetic full backup. If the result of the determination is NO, which indicates the latest snapshot of the previous backup does not match the current snapshot of the source data (i.e., previous backup has failed), the method proceeds to Step 340 in FIG. 3C to resolve the error that resulted in the failure and perform a synthetic full backup.

Turning to FIG. 3B, in Step 320, because the previous backup was successful, a new snapshot of the source data is generated. In one or more embodiments, the new snapshot is generated by a source device agent of a source node. In one or more embodiments, the new snapshot is a point-in-time copy of the file system of the source data at the point-in-time the snapshot is generated, which is later in time than the snapshot created in Step 300 prior to the initial full backup. The new snapshot is now considered a current snapshot of the source data (i.e., it is now the most recent snapshot of the file system on the source node). Said another way, the snapshot generated in Step 320 replaces the snapshot used in Step 308 as the current snapshot.

In Step 322, a snapshot difference report is generated. In one or more embodiments, the snapshot difference report is generated by a source device agent of a source node. In one or more embodiments, the snapshot difference report is generated using the snapshot obtained in Step 320 and the snapshot used in Step 308.

In one or more embodiments, the snapshot difference report represents the differences in the source data from the time the previous snapshot (i.e., the snapshot in Step 308) was obtained and the time the new snapshot was generated (i.e., the snapshot generated in Step 320). In one or more embodiments, the differences between the snapshots are represented in the snapshot difference report associated with four operations: delete, rename, create, and modify. In one or more embodiments, the snapshot difference report includes a listing of files and/or folders that were deleted from the source data since the previous snapshot was taken. In one or more embodiments, the snapshot difference report includes a listing of files and/or folders that were renamed in the source data since the previous snapshot was taken. In one or more embodiments, the snapshot difference report includes a listing of files and/or folders that were added to the source data (i.e., created) since the previous snapshot was taken. In one or more embodiments, the snapshot difference report includes a listing of the files and/or folders that were modified in the source data since the previous snapshot was taken. Modification of a file and/or a folder of the source data may include, but is not limited to, changing the content of the file and/or folder, altering metadata (e.g., permissions, attributes, etc.) associated with the folder, or any combination thereof.

In one or more embodiments, the snapshot difference report is first used to determine which files and/or folders were deleted from the source data since the last backup, and such files and/or folders are deleted from the copy of the previous backup in the data domain. Next, in one or more embodiments, the snapshot difference report is used to determine which files and/or folders of the source data were renamed since the last backup, and such files and/or folders are correspondingly renamed in the copy of the previous backup in the data domain. In one or more embodiments, at this point in the process, all deletes and renames that have occurred in the source data since the last backup are reflected in the copy of the backup in the target data domain, without having to have copied any of the files and/or folders from the source device(s) to the data domain.

In one or more embodiments, using the generated snapshot difference report, three lists are created. In one or more embodiments, the first list includes entries of deleted files and/or folders. In one or more embodiments, the second list includes the entries of renamed files and/or folders. In one or more embodiments, the third list includes entries of created and/or modified files and/or folders. In one or more embodiments, these lists are used to perform the synthetic full backup.

Next, in one or more embodiments, the snapshot difference report is used to identify all files and/or folders that were created and/or modified since the last backup was performed. In one or more embodiments, the copied and/or modified files and/or folders are added to a copy list. In one or more embodiments, the copy list is used as input for a copy operation, which copies the files and/or folders of the copy list to the copy of the previous backup in the data domain. In one or more embodiments, during the copy operation, the created files and/or folders are added to the backup on data domain, and the modified files and/or folders are overwritten.

In one or more embodiments, any permissions and/or attributes for the created and/or modified files are also associated with the copies of the files and/or folders in the data domain backup copy of the source data. In one or more embodiments, after the delete operation, the rename operation, and the copy operation for the created and/or modified files and/or folders, the copy of the previous backup in the data domain has been transformed into a synthetic full backup of the current state of the source data, with the only actual copying of the source data being the copying of the created and/or modified files and/or folders. In one or more embodiments, after the successful synthetic full backup, metadata of this synthetic full backup is updated, which will be used to verify the status of this backup during the next synthetic full backup cycle.

Continuing with the discussion of FIG. 3B, in Step 324, a copy of a previous backup is stored in the data domain. In one or more embodiments, the copy of the previous backup is a copy of the backup created using the previous snapshot (i.e., the snapshot in Step 308). In one or more embodiments, the copy of the previous backup is a copy of the initial full backup. In one or more embodiments, the copy of the previous backup is a copy of the last synthetic full backup.

In Step 326, a delete operation is performed on the copy of the previous backup based on the snapshot difference report. In one or more embodiments, the delete operation is performed on the copy of the previous backup by the source device agent. In one or more embodiments, the delete operation includes deleting of files and/or folders from the copy of the previous backup listed as deleted in the snapshot difference report generated in Step 322.

In Step 328, a rename operation is performed on the copy of the previous backup based on the snapshot difference report. In one or more embodiments, the rename operation is performed on the copy of the previous backup by the source device agent. In one or more embodiments, the rename operation includes renaming of files and/or folders in the copy of the previous backup based on the listing of renamed files and/or folders in the snapshot difference report generated in Step 322.

In Step 330, a copy operation is performed on the copy of the previous backup based on the snapshot difference report. In one or more embodiments, the copy operation is performed on the copy of the previous backup by the source device agent. In one or more embodiments, the copy operation includes the adding of files and/or folders to the copy of the previous backup listed as created in the snapshot difference report generated in Step 322. In one or more embodiments, the copy operation includes the overwriting of files and/or folders in the copy of the previous backup that is listed as modified in the snapshot difference report generated in Step 322. In one or more embodiments, overwriting the modified files and/or folders in the copy of the previous backup causes the files and/or folders, after the overwriting, to be modified in the same way that the source data was modified, including changes to the content of the files and/or folders and to any metadata associated with the files and/or folders.

In one or more embodiments, after Step 330, the copy of the previous backup in the data domain has been transformed into a new synthetic full backup of the source data corresponding to the point-in-time at which the new snapshot was taken in Step 320. In one or more embodiments, a synthetic full backup is equivalent to a full backup of source data at a point-in-time, without having to copy all of the source data to a data domain, which is achieved using a snapshot difference report to perform operations on a copy of a previous backup. In one or more embodiments, a synthetic full backup may be used, for example, to restore the source data to the point-in-time copy of the source data represented by the synthetic full backup. Such a restoration need not include, for example, any lookups or amalgamation of incremental backups, as the synthetic full backup includes a copy of all of the source data. In Step 332, after a successful synthetic full backup, metadata of this synthetic full backup is updated, which will be used to verify the status of this backup during the next synthetic full backup cycle. After Step 332, the method ends.

Figure 3C:
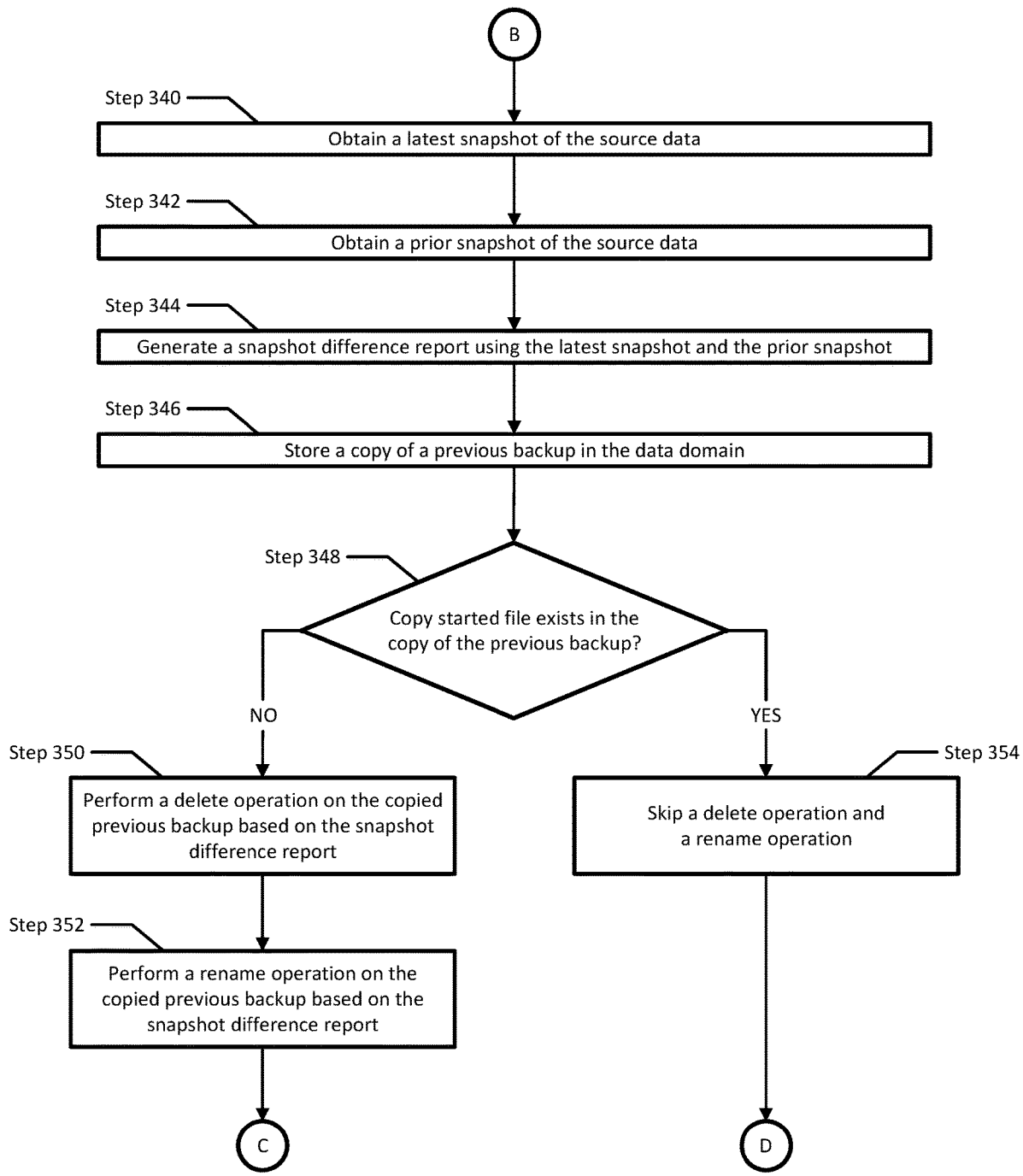

Turning to FIG. 3C, when the result of the determination is NO in Step 310 in FIG. 3A, then in Step 340, a latest snapshot of the source data is obtained. In one or more embodiments, the latest snapshot of the source data is obtained by a source device agent of a source node. In one or more embodiments, the latest snapshot is the most recently taken point-in-time copy of the file system of the source data. For example, the latest snapshot corresponds to the snapshot in Step 308.

In Step 342, a prior snapshot of the source data is obtained. In one or more embodiments, the prior snapshot of the source data is obtained by a source device agent of a source node. In one or more embodiments, the prior snapshot is a point-in-time copy of the file system of the source data, which was taken before the latest snapshot obtained in Step 340 (i.e., snapshot of the file system the proceeded the snapshot in Step 308).

In Step 344, a snapshot difference report is generated. In one or more embodiments, the snapshot difference report is generated by a source device agent of a source node. In one or more embodiments, the snapshot difference report is generated using the latest snapshot obtained in Step 340 and the prior snapshot obtained in Step 342. In one or more embodiments, the latest snapshot of the source data is the most recently taken successful snapshot of the source data at a point-in-time before the failed backup (i.e., the backup that was determined to have failed pursuant to the determination in Step 310).

In Step 346, a copy of a previous backup is stored in the data domain, which corresponds to the backup generated using snapshot obtained in Step 342. In one or more embodiments, the copy of the previous backup is a copy of the backup created using the previous backup. In one or more embodiments, the copy of the previous backup is a copy of the initial full backup or a copy of the last synthetic full backup.

In Step 348, a determination is made about whether a copy started file exists in the previous backup. In one embodiment, the presence of a copy started file indicates that delete and rename were performed on the previous backup and do not need to be performed again for the previous backup. If the result of the determination is NO, which indicates a copy started file does not exist in the previous backup, the method proceeds to Step 350. If the result of the determination is YES, which indicates a copy started file exists in the previous backup, the method proceeds to Step 354.

In Step 350, because the copy started file does not exist, a delete operation is performed on the copy of the previous backup, where the delete operation includes deleting files and/or folders from the copy of the previous backup based on the snapshot difference report in Step 344.

In Step 352, because the copy started file does not exist, a rename operation is performed on the copy of the previous backup, where the rename operation includes renaming of files and/or folders in the copy of the previous backup based on the listing of renamed files and/or folders in the snapshot difference report in Step 344. The process then proceeds to Step 360 in FIG. 3D.

In Step 354, because the copy started file exists, delete and rename operations are skipped. The process then proceeds to Step 364 in FIG. 3D.

Figure 3D:
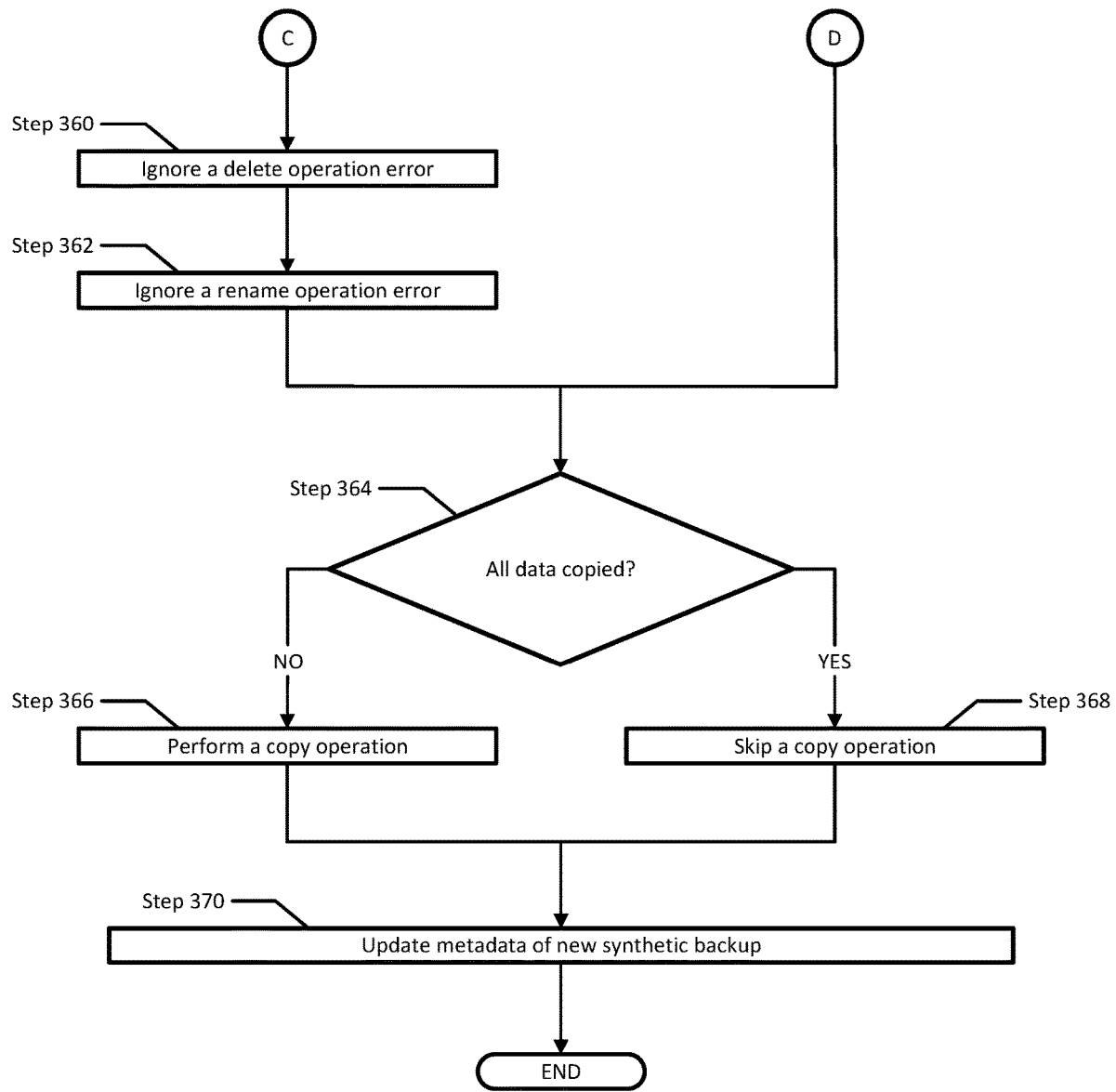

Turning to FIG. 3D, in Step 360, during the delete operation performed in Step 350, one or more delete errors may occur; however, these delete errors may be ignored because the delete errors do not impact the contents of the backup (i.e., a delete operation error is ignored, which provides idempotent feature of the method).

In Step 362, during the rename operation performed in Step 352, one or more rename errors may occur; however, these rename errors may be ignored because the rename errors do not impact the contents of the backup (i.e., a rename operation error is ignored, which provides idempotent feature of the method).

In Step 364, a determination is made about whether all data is copied from the source node to the backup (i.e., the copy of the previous backup specified in Step 346) in the data domain. This determination could be made by evaluating a copy list to determine if one is present and/or if there are any files listed on the copy list. If the result of the determination is NO, which indicates a first portion of data items in the copy list exists in the previous backup, and a second portion of data items does not exist in the previous backup, the method proceeds to Step 366 to perform a copy operation. If the result of the determination is YES, which indicates that all of the data was copied, the method proceeds to Step 368 to skip a copy operation.

In Step 366, because the data was not copied or only partially copied, a copy operation is performed on the copy of the previous backup, where the copy operation includes adding and/or overwriting of files and/or folders to the copy of the previous backup based on the copy list.

In Step 368, because all of the data was copied, the method proceeds to Step 370 and skips performance of a copy operation.

In one or more embodiments, after Step 366 and Step 368, the copy of the previous backup in the data domain has been transformed into a new synthetic full backup of the source data corresponding to the point-in-time at which the latest snapshot was taken in Step 340. In one or more embodiments, a synthetic full backup is equivalent to a full backup of source data at a point-in-time, without having to copy all of the source data to a data domain, which is achieved using a snapshot difference report to perform operations on a copy of a previous backup. In one or more embodiments, a synthetic full backup may be used, for example, to restore the source data to the point-in-time copy of the source data demonstrated by the synthetic full backup. Such a restoration need not include, for instance, any lookup or amalgamation of incremental backups, as the synthetic full backup includes a copy of all of source data. In Step 370, after a successful synthetic full backup, metadata of this synthetic full backup is updated, which will be used to verify the status of this backup during the next synthetic full backup cycle. After Step 370, the method ends.

EXAMPLE

The above describes systems and methods for generating synthetic full backups in accordance with one or more embodiments of the invention. Such embodiments may be used for generating any number of synthetic full backups of any type of source data of any number of source nodes, and storing the one or more synthetic full backups in a data domain. However, for the sake of brevity and simplicity, consider the following simplified scenario to illustrate at least a portion of the concepts described herein. The example is not intended to limit the scope of the embodiments and/or the claims of the instant application.

Consider a scenario in which a device ecosystem includes a Hadoop cluster of virtual machines (i.e., source nodes) and an associated HDFS (i.e., source data). In such a scenario, at a point in time, a first snapshot (S1) is taken of the HDFS by a source device agent executing on one of the virtual machines of the cluster. The first snapshot is used to generate an initial full backup (B1) of the HDFS to a data domain. Due to the size of the HDFS, the initial full backup takes a long time to perform, and consumes a considerable amount of compute resources. During the initial full backup, all of the files and/or folders of the HDFS are copied to the data domain.

A backup schedule is configured for the HDFS that triggers (i.e., requests) a backup to be performed every twelve hours. However, the initial full backup took longer than twelve hours to perform, due to the amount of data that had to be copied from the HDFS to the data domain. In order to meet the backup schedule, techniques described herein are used to reduce the time necessary for backing up the HDFS by generating synthetic full backups at the scheduled times instead of full backups and to ensure the generation of synthetic full backups in the case of failure. As discussed above, a synthetic full backup is equivalent to a full backup of source data at a point-in-time, without having to copy all of the source data to a data domain, which is achieved using a snapshot difference report to perform operations on a copy of a previous backup.

After twelve hours has passed since B1 was generated, a source device agent executing in the Hadoop cluster obtains a latest snapshot (S1*) associated with the initial full backup (B1) from data domain, and a latest snapshot (S1) of the HDFS (i.e., the snapshot that was used to generate B1). In this example assume that B1 was a successful backup that was generated in accordance with FIGS. 3A-3D.

Because S1=S1*, B1 is determined to be successful and the source device agent proceeds to generate a first synthetic full backup (B2), where a latest snapshot of the HDFS (i.e., the snapshot that was used to generate B2) is S2. In this example assume that B2 was generated in accordance with FIGS. 3A-3D; however, assume that B2 was not a successful backup.

After twelve hours has passed since B2 was generated, the source device agent initiates the generation of a second synthetic full backup in accordance with FIGS. 3A-3D. More specifically, the source device agent determines if the previous backup is successful or failed, by comparing S2 and S2* (obtained from data domain). In this example, S2 does not match S2* (i.e., S2≠S2*), which means the previous backup (i.e., B2) has failed. In response to this determination, the latest snapshot of the HDFS (i.e., S2) and a prior snapshot of the HDFS (S1) are obtained. Next, the source device agent uses the two snapshots (i.e., S1 and S2) to generate a snapshot difference report (i.e., S2−S1). The snapshot difference report includes listings of files and/or folders that were deleted from the source data in the time between the two snapshots, renamed in the source data in the time between the two snapshots, created in (i.e., added to) the source data in the time between the two snapshots, and modified in the source data in the time between the two snapshots.

Next, a copy of synthetic full backup (B2C) is stored in the data domain, which corresponds to the backup (B2) generated using S2. Next, the source device agent determines that a copy started file exists in B2C. The presence of the copy started file indicates that delete and rename were performed on B2C and do not need to be performed again for B2C. In this example, because the copy started file exists in B2C, the delete and rename operations are skipped. Next, the source device agent determines that all data required for the backup was not copied from the HDFS to the data domain. In response to this determination, only files and/or folders that do not exist in B2C are copied to ensure the failed files and/or folders are copied.

At this time in the scenario, the B2C has been transformed into a successful synthetic full backup of the HDFS (i.e., HDFS corresponding to S2), by only copying the files and/or folders that do not exist in the B2C. As such, the creation of the synthetic full backup took considerably less time than twelve hours. After a successful backup operation, metadata of this synthetic full backup is updated, wherein the metadata will be used to verify the status of this backup during the next synthetic full backup cycle.

The next time a backup is scheduled to occur in this scenario (i.e., twelve hours later), a similar process is performed to ensure a successful synthetic full backup. This process may be repeated for as long as the backup schedule for the HDFS is being run, thereby generating any number of synthetic full backups of the source data at different points-in-time without having to copy the source data in its entirety or, when a restore operation is requested, waste the resources necessary to amalgamate incremental backups to perform the restore of the HDFS.

End of Example

Figure 4:
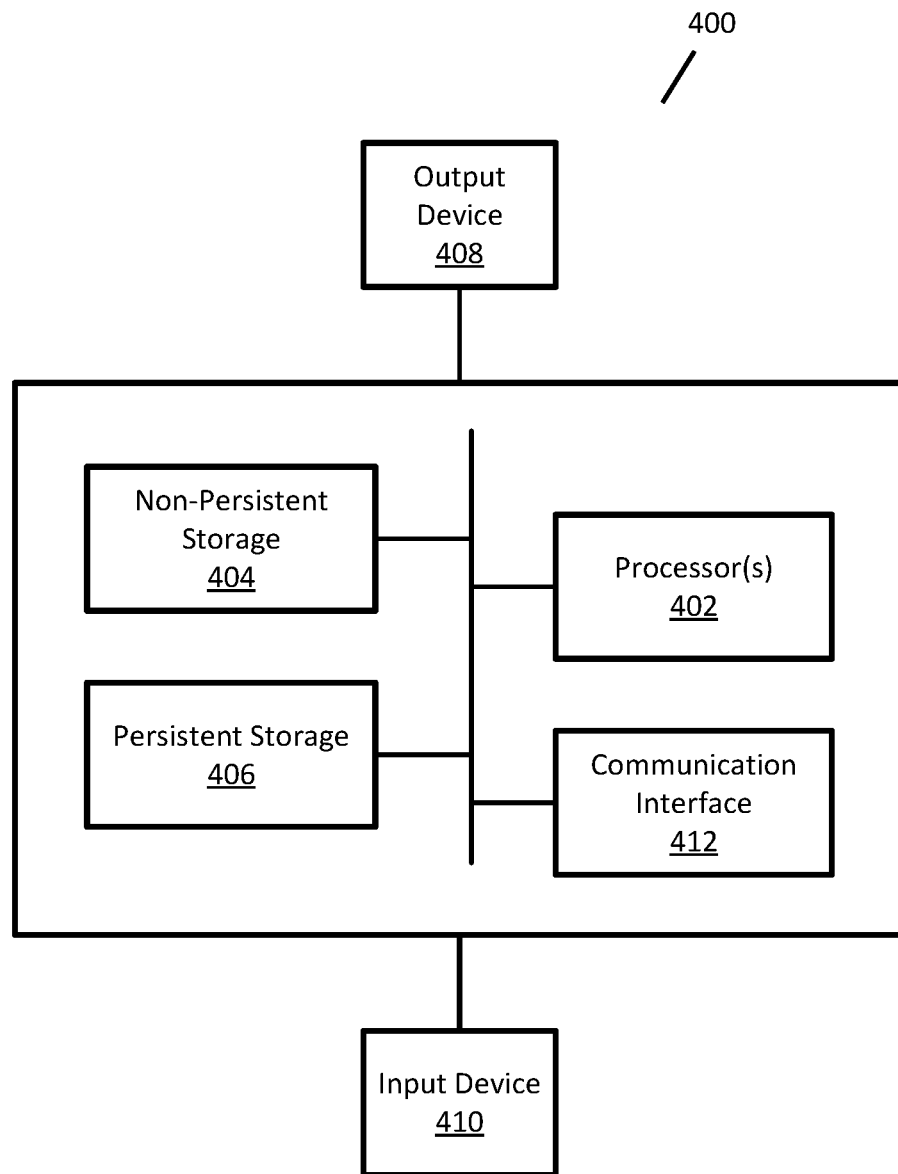
FIG. 4 shows a computing system in accordance with one or more embodiments described herein.

As discussed above, embodiments described herein may be implemented using computing devices. FIG. 4 shows a diagram of a computing device in accordance with one or more embodiments described herein. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN), such as the Internet, mobile network, or any other type of network) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed above should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for generating synthetic full backups, the method comprising:

performing a verification that a previous backup of source data stored in a data domain (DD) is a failed synthetic full backup (SFB);

obtaining, based on the verification and based on a user initiated backup request to perform another backup of the source data to the DD, a latest snapshot of the source data, wherein the latest snapshot of the source data is a most recently taken successful snapshot of the source data before the failed SFB, wherein a source node is configured as a Hadoop cluster and stores the source data;

obtaining, based on the verification, a prior snapshot of the source data, wherein the prior snapshot is created before the latest snapshot and used to perform the failed SFB;

generating a snapshot difference report using the latest snapshot and the prior snapshot, wherein the snapshot difference report comprises a delete list, a rename list, and a copy list comprising a list of data items;

making a first determination that a copy started file (CSF) does not exist in the previous backup, wherein the non-existence of the CSF indicates that neither a delete operation and a rename operation was performed on the previous backup;

making, after the first determination, a second determination, using the copy list, that a first portion of the data items in the copy list exists in the previous backup, and a second portion of the data items does not exist in the previous backup;

performing, based on the second determination and using the snapshot difference report, a copy operation on a copy of the previous backup to copy the second portion of the data items to the DD to obtain a SFB; and updating, upon obtaining the SFB, permissions and attributes associated with files and/or folders of the source data included in the SFB to verify a status of the SFB during a next synthetic full backup cycle.

2. The method of claim 1, further comprising:
based on the first determination:
performing a delete operation using the delete list; and
performing a rename operation using the rename list.

3. The method of claim 1, wherein performing the verification comprises:
obtaining a snapshot name associated with the previous backup; and
making a third determination that the snapshot name does not correspond to the latest snapshot.

4. The method of claim 1, wherein the source data is a Hadoop Distributed File System (HDFS).

5. The method of claim 1, wherein the previous backup is one selected from a group consisting of an initial full backup and a second synthetic full backup.

6. The method of claim 2, further comprising:
ignoring, during the delete operation, a delete operation error; and
ignoring, during the rename operation, a rename operation error.

7. A non-transitory computer readable medium comprising computer readable program code, which when executed by a computer processor enables the computer processor to perform a method for generating synthetic full backups, the method comprising:

performing a verification that a previous backup of source data stored in a data domain (DD) is a failed synthetic full backup (SFB);

obtaining, based on the verification and based on a user initiated backup request to perform another backup of the source data to the DD, a latest snapshot of the source data, wherein the latest snapshot of the source data is a most recently taken successful snapshot of the source data before the failed SFB, wherein a source node is configured as a Hadoop cluster and stores the source data;

obtaining, based on the verification, a prior snapshot of the source data, wherein the prior snapshot is created before the latest snapshot and used to perform the failed SFB;

generating a snapshot difference report using the latest snapshot and the prior snapshot, wherein the snapshot difference report comprises a delete list, a rename list, and a copy list comprising a list of data items;

making a first determination that a copy started file (CSF) does not exist in the previous backup, wherein the non-existence of the CSF indicates that neither a delete operation and a rename operation was performed on the previous backup;

making, after the first determination, a second determination, using the copy list, that a first portion of the data items in the copy list exists in the previous backup, and a second portion of the data items does not exist in the previous backup;

performing, based on the second determination and using the snapshot difference report, a copy operation on a copy of the previous backup to copy the second portion of the data items to the DD to obtain a SFB; and updating, upon obtaining the SFB, permissions and attributes associated with assets files and/or folders of the source data included in the SFB to verify a status of the SFB during a next synthetic full backup cycle.

8. The non-transitory computer readable medium of claim 7, further comprising:
based on the first determination:
performing a delete operation using the delete list; and
performing a rename operation using the rename list.

9. The non-transitory computer readable medium of claim 7, wherein performing the verification comprises:
obtaining a snapshot name associated with the previous backup; and
making a third determination that the snapshot name does not correspond to the latest snapshot.

10. The non-transitory computer readable medium of claim 7, wherein the source data is a Hadoop Distributed File System (HDFS).

11. The non-transitory computer readable medium of claim 7, wherein the previous backup is one selected from a group consisting of an initial full backup and a second synthetic full backup.

12. The non-transitory computer readable medium of claim 8, further comprising:
ignoring, during the delete operation, a delete operation error; and
ignoring, during the rename operation, a rename operation error.

13. A system for generating synthetic full backups, the system comprising:
a processor comprising circuitry;
memory; and
a source node operatively connected to a data domain (DD), executing on the processor and using the memory, and configured to:
perform a verification that a previous backup of source data stored in the DD ais a failed synthetic full backup (SFB);
obtain, based on the verification and based on a user initiated backup request to perform another backup of the source data to the DD, a latest snapshot of the source data, wherein the latest snapshot of the source data is a most recently taken successful snapshot of the source data before the failed SFB, wherein a source node is configured as a Hadoop cluster and stores the source data;
obtain, based on the verification, a prior snapshot of the source data, wherein the prior snapshot is created before the latest snapshot and used to perform the failed SFB;
generate a snapshot difference report using the latest snapshot and the prior snapshot, wherein the snapshot difference report comprises a delete list, a rename list, and a copy list comprising a list of data items;
make a first determination that a copy started file (CSF) does not exist in the previous backup, wherein the non-existence of the CSF indicates that neither a delete operation and a rename operation was performed on the previous backup;
make, after the first determination, a second determination, using the copy list, that a first portion of the data items in the copy list exists in the previous backup, and a second portion of the data items does not exist in the previous backup;
perform, based on the second determination and using the snapshot difference report, a copy operation on a copy of the previous backup to copy the second portion of the data items to the DD to obtain a SFB; and
update, upon obtaining the SFB, permissions and attributes associated with files and/or folders of the source data included in the SFB to verify a status of the SFB during a next synthetic full backup cycle.

14. The system of claim 13, wherein the source node is further configured to:
based on the first determination:
perform a delete operation using the delete list; and
perform a rename operation using the rename list.

15. The system of claim 13, wherein to perform the verification, the source node is further configured to:
obtain a snapshot name associated with the previous backup; and
make a third determination that the snapshot name does not correspond to the latest snapshot.

16. The system of claim 13, wherein the source data is a Hadoop Distributed File System (HDFS).

17. The system of claim 14, wherein the source node is further configured to:
ignore, during the delete operation, a delete operation error; and
ignore, during the rename operation, a rename operation error.

* * * * *